Dec. 10, 1935.  M. B. HALL  2,023,922
DRAFT GEAR
Filed May 1, 1933

Inventor
Marchand B. Hall
By Wilson, Mann & Co.
Attys.

Patented Dec. 10, 1935

2,023,922

UNITED STATES PATENT OFFICE 2,023,922

DRAFT GEAR

Marchand B. Hall, Chicago, Ill., assignor to Cardwell-Westinghouse Company, Chicago, Ill., a corporation of Delaware Application May 1, 1933, Serial No. 668,685

2 Claims. (Cl. 213—26)

This invention relates to shock absorbing mechanism, and, more particularly, to draft gears for railway cars.

One of the objects of the invention is the provision of a new and improved draft gear having a novel arrangement of friction elements.

A further object of the invention is the provision of a new and improved draft gear having a novel arrangement of the friction elements and of the means for limiting the expansion of the gear.

A still further object of the invention is the provision of a new and improved draft gear having a novel arrangement of the engaging surfaces of the friction elements.

Another object of the invention is the provision of a new and improved draft gear that is simple in construction, efficient in operation, inexpensive to manufacture and which may be easily and readily assembled.

Other and further objects and advantages of the invention will appear from the following description taken in connection with the accompanying drawing, in which—

Figure 1:
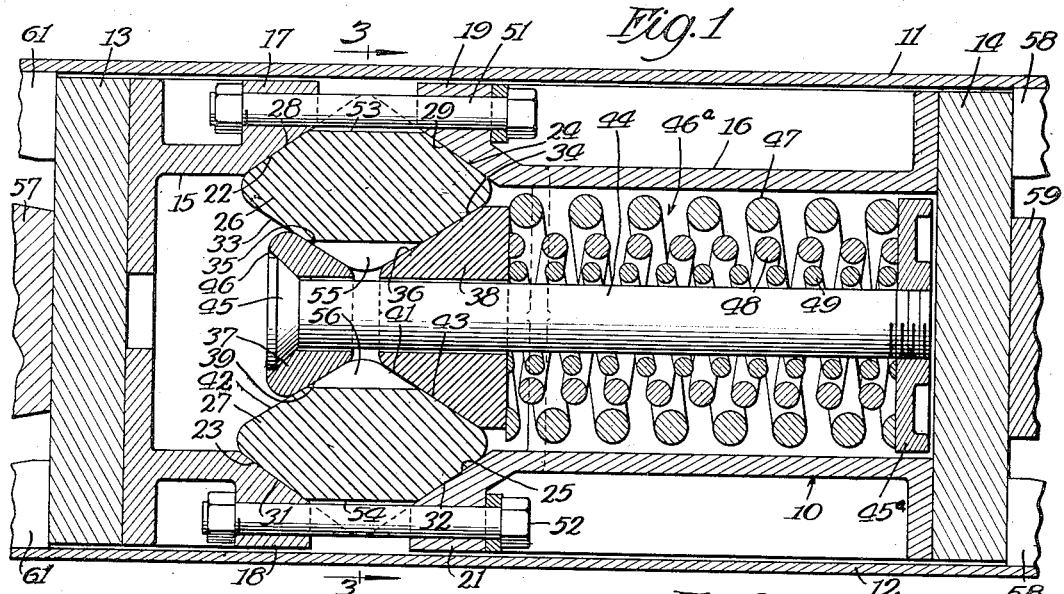
Fig. 1 is a horizontal section of the device showing the same in released position.
Figure 2:
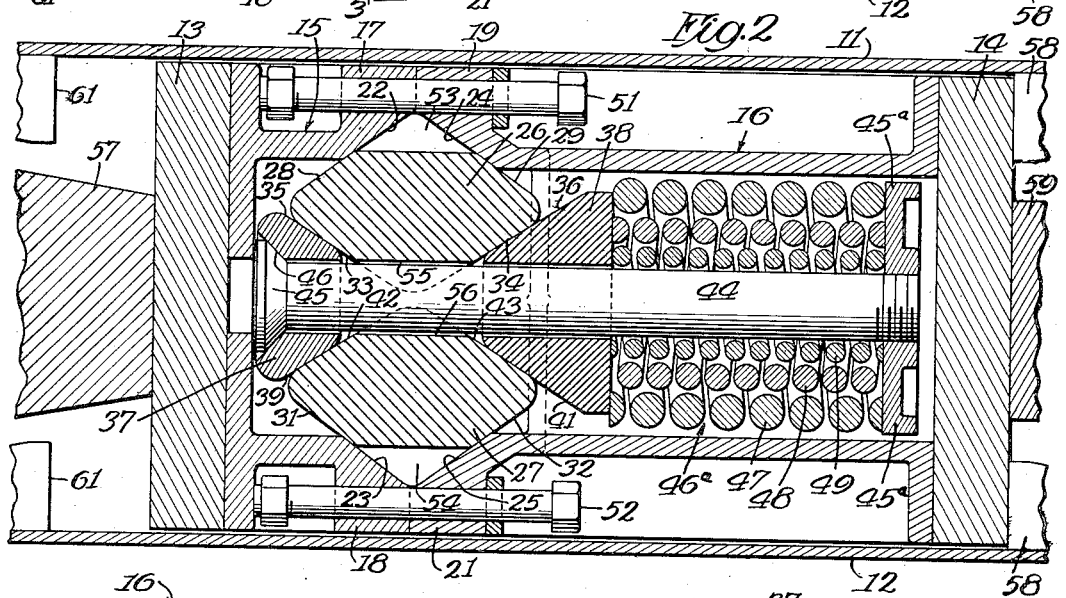
Fig. 2 is a similar view but showing the parts under compression.

In the construction of friction draft gears, considerable difficulty has been experienced in obtaining a gear that has sufficient capacity and which will release smoothly and promptly. When the gear is designed to have a prompt and suitable release, it is often of low capacity and vice-versa. The present invention seeks to remedy this difficulty by the provision of a construction that has the desired release and in which the capacity may be varied within wide limits by changing the angles of the friction surfaces of certain of the elements.

Referring now to the drawing, the reference character 10 designates generally the shock absorber or draft gear which is adapted to be located between the center sills 11 and 12 of a railway car and between a pair of follower blocks 13 and 14, as is usual in such constructions. The block 13 may be omitted if desired.

The gear comprises the front follower member 15 and the rear follower member 16. Preferably, these members are hollow and have their adjacent side edges turned outwardly to form the flanges 17, 18, 19 and 21. The flanges 17 and 18 on the follower member 15 are provided on the inner surface with inclined wedge faces 22 and 23 and the flanges 19 and 21 are provided with similar wedge faces 24 and 25, which are adapted to frictionally engage a suitable wedge mechanism. This mechanism comprises a pair of wedge members 26 and 27 at each side of the gear. The wedge member 26 has outwardly converging inclined faces 28 and 29 on its outer side parallel with and engaging the friction surfaces 22 and 24, respectively. The wedge member 27 is likewise provided with similar outwardly converging wedge faces 31 and 32 which are parallel with and frictionally engage the wedging faces 23 and 25 of the followers 15 and 16, respectively.

Suitable means are provided for frictionally engaging the wedge members 26 and 27 on their inner surfaces. In the form of construction selected to illustrate one embodiment of the invention, the wedge member 26 is provided with inwardly converging wedge faces 33 and 34 which are adapted to be engaged by corresponding wedge faces 35 and 36 of a pair of reversely arranged wedge elements 37 and 38. The wedge elements 37 and 38 have wedge faces 39 and 41 corresponding to the wedge faces 35 and 36. The wedge faces 39 and 41 of these elements are adapted to frictionally engage corresponding wedge faces 42 and 43 on the inner side of the wedge member 27.

Suitable means are provided for resisting the relative movement of the casing and wedge elements and for restoring the parts to normal position after release. As shown, the wedge elements 37 and 38 are provided with aligned openings extending longitudinally of the gear and a bolt 44 extends through said axial openings. The bolt preferably, though not necessarily, has a conical head 45 on its forward end which is adapted to seat in a corresponding recess 46 in the base of the wedge elements 37 whereby the bolt head will not extend outwardly beyond the forward end of the wedge element 37. The rear end of the bolt 44 is provided with a spring seat 45a secured to the same in any suitable manner, as by being threaded thereon. Suitable spring means designated generally by the reference character 46a is interposed between the base of the wedge element 38 and the spring seat 45a. This means may comprise one or more springs. As shown, three springs 47, 48 and 49 are employed, the same being arranged concentrically on the bolt or rod 44 in order to secure the maximum spring resistance for the space available for such springs.

Suitable means are provided for limiting the separation of the two follower members 15 and 16. In the form of construction shown, the flanges 17 and 19 are provided with aligned openings through which a headed bolt 51 extends. This bolt is provided with the usual nut and is of such length that it will permit the follower members to separate a predetermined distance apart. The flanges 18 and 21 are similarly provided with aligned openings through which a bolt 52 similar to the bolt 51 is inserted.

Figure 3:
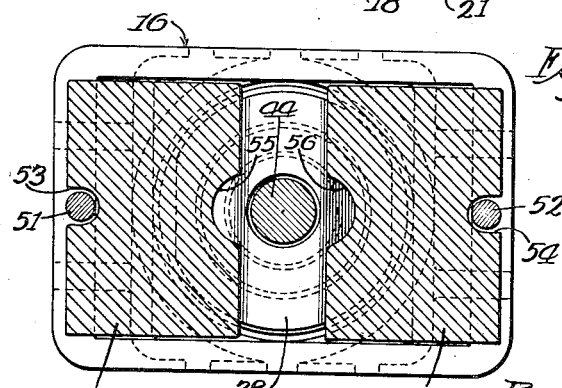
Fig. 3 is a section on the line 3—3 of Fig. 1.
Figure 4:
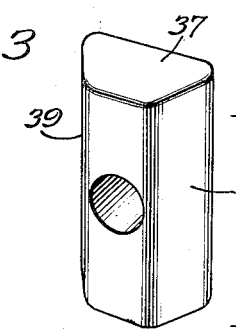
Fig. 4 is a perspective view of one of the wedge elements.

The wedge members 26 and 27 are provided with grooves 53 and 54, respectively, on their outer portions for providing sufficient clearances for the bolts 51 and 52 when the gear is released, as clearly shown in Figs. 1 and 3 of the drawing. Likewise the inner portions of these wedge members are provided with grooves 55 and 56 for receiving the bolt 44 when the gear is compressed. The compression of the gear is limited by the contact of the inner ends of the casings 15 and 16.

In constructing the gear, the angles formed by the wedge faces 22 and 24 of the wedge member 26 and the corresponding angle formed by the wedge faces 31 and 32 of the wedge members 27 are determined or calculated so that the gear will have the proper release and will not stick on its releasing movement. The angle must necessarily be greater than the angle of repose.

The capacity of the gear is determined largely by the angles formed by the inner faces of the wedge members 26 and 27 and those of the cooperating wedge elements 37 and 38. By making the angle formed by the faces of the wedge elements 37 and 38 more acute, the higher the capacity of the gear, other things being equal. The size and strength of the spring is also a factor in determining the gear capacity. With the ever increasing size of cars, it is necessary that the gear be of very high capacity. Usually, the maximum spring resistance consistent with the dimension of the pocket within which the same is housed is employed. The capacity then will be determined by the angles of the cooperating wedge faces on the wedge elements 37 and 38 and those on the wedge members 26 and 27.

In the operation of the device, a buff of the gear by the drawbar 57 will seat the gear against the buffing lugs 58 on the center sills 11 and 12 and if of sufficient force, will cause the casing 15 to move rearwardly. Likewise, a pull on the drawbar will cause the yoke 59, attached thereto and encircling the gear, to seat the gear against the draft lugs 61, and, if of sufficient force, will cause the casing 16 to move forwardly, thereby wedging the wedge members 26 and 27 inwardly which in turn will separate the wedge elements 37 and 38 against the compression of the springs 47, 48 and 49.

It will thus be seen that the less acute the angles formed by the wedge faces of the wedge elements 37 and 38, the more easily these elements are forced apart by the wedge members and hence the less capacity the gear possesses, and the more acute the angles, the greater the capacity of the gear.

It will be noted that with a given angle for the outer wedge faces of the wedge members 26 and 27, the travel of the wedge elements 37 and 38 must necessarily be confined to certain limits because of the size of the gear pocket and that this travel will vary as the angle formed by the wedge faces of the wedge elements 37 and 38, and this, in turn, will affect the length of the springs that may be used. The gear capacity is preferably varied by changing the angle of the wedge elements, but may be varied within limits by changing the size or nature of the spring resistance.

I claim as my invention:

1. A draft gear for use in the draft gear pocket of a railway car comprising a pair of casings, each having flanges on its ends terminating adjacent to the side walls of said pocket, one of said casings being tubular and open at both ends, bolts extending through the flanges on adjacent ends of said casings for limiting the separation of said casings, inclined frictional surfaces on said flanges and the inner ends of said casings, blocks having wedging faces engaging said friction surfaces, wedge members engaging said blocks, a bolt element extending through said members, a cap on said last named bolt element of slightly less diameter than the interior of the tubular casing and constituting a closure for said last-named casing, and spring means on said bolt interposed between said cap and one of said wedge members, and constituting the sole resilient means for resisting the separation of said wedge members, said blocks having recesses on opposite portions thereof for receiving said bolts whereby the friction surfaces thereon are greatly increased in area.

2. In a draft gear, a pair of follower casings, flanges on opposite sides of the adjacent ends of said casings, said flanges being adapted to engage for limiting the compression of the gear, the adjacent ends of said casings and adjacent flanges being provided with inclined wedging faces, bolts extending through the adjacent flanges of said casings for limiting the separation of said casings, a pair of wedge blocks engaging said wedging faces, a pair of wedge members engaging said wedge blocks, a bolt extending through said wedge members and having its head in engagement with one of them, a cap on the other end of said last-named bolt of slightly less diameter than the interior diameter of the casing whereby said bolt will prevent skewing of said block and wedge elements, and a spring between said cap and said wedge members, the exterior surface of said spring being separated from the top and bottom walls of said casing within which said spring is contained only a sufficient distance to afford proper clearance for operation.

MARCHAND B. HALL.